(12) United States Patent
Pavlina et al.

(10) Patent No.: US 11,491,581 B2
(45) Date of Patent: Nov. 8, 2022

(54) PRESS HARDENED STEEL WITH TAILORED PROPERTIES

(71) Applicant: AK Steel Properties, Inc., West Chester, OH (US)

(72) Inventors: Erik James Pavlina, Lebanon, OH (US); Stephen Bryant Tate, Midland, NC (US)

(73) Assignee: Cleveland-Cliffs Steel Properties Inc., West Chester, OH (US)

( * ) Notice: Subject to any disclaimer, the term of this patent is extended or adjusted under 35 U.S.C. 154(b) by 569 days.

(21) Appl. No.: 16/179,387

(22) Filed: Nov. 2, 2018

(65) Prior Publication Data

US 2019/0126400 A1 May 2, 2019

Related U.S. Application Data

(60) Provisional application No. 62/580,591, filed on Nov. 2, 2017.

(51) Int. Cl.
*C21D 1/19* (2006.01)
*B23K 26/322* (2014.01)
(Continued)

(52) U.S. Cl.
CPC ........ *B23K 26/322* (2013.01); *B23K 35/3073* (2013.01); *B23K 35/3086* (2013.01); *C21D 1/19* (2013.01); *C21D 1/22* (2013.01); *C21D 6/002* (2013.01); *C21D 6/005* (2013.01); *C21D 6/008* (2013.01); *C22C 38/02* (2013.01); *C22C 38/04* (2013.01); *C22C 38/12* (2013.01); *C22C 38/14* (2013.01); *C22C 38/22* (2013.01); *C22C 38/24* (2013.01); *C22C 38/26* (2013.01);
(Continued)

(58) Field of Classification Search
CPC ................ B21D 22/022; B21D 35/006; B23K 2101/185; B23K 2101/34; B23K 2103/04; C21D 6/002; C21D 6/005; C22C 38/04; C22C 2/28
USPC ....................................................... 148/524
See application file for complete search history.

(56) References Cited

U.S. PATENT DOCUMENTS 6,603,092 B2    8/2003   Briand et al.
6,702,904 B2 *   3/2004   Kami .................... C22C 38/001
                                                         148/320
(Continued)

FOREIGN PATENT DOCUMENTS

CN       106350741 A     1/2017
DE       102007015963 A1 * 10/2008 ............. B23K 26/24
(Continued)

OTHER PUBLICATIONS

NPL: on-line translation of DE-102007015963-A1, Oct. 2008 (Year: 2008).*

(Continued)

*Primary Examiner* — Jie Yang
(74) *Attorney, Agent, or Firm* — Frost Brown Todd LLC

(57) ABSTRACT

A tailor-welded blank is made of two steels, one steel of Alloy A and one steel of Alloy B. Alloy A comprises 0.10-0.50 wt % C, 0.1-0.5 wt % Si, 2.0-8.0 wt % Mn, 0.0-6.0 wt % Cr, 0.0-2.0 wt % Mo, 0.0-0.15 wt % Ti, and 0.0-0.005 wt % B and wherein Alloy B comprises 0.06-0.12 wt % C, 0.1-0.25 wt % Si, 1.65-2.42 wt % Mn, 0.0-0.70 wt % Cr, 0.08-0.40 wt % Mo, 0.0-0.05 wt % V, and 0.01-0.05 wt % Ti.

21 Claims, 2 Drawing Sheets

(51) Int. Cl.

| | |
|---|---|
| *B23K 35/30* | (2006.01) |
| *C22C 38/04* | (2006.01) |
| *C22C 38/32* | (2006.01) |
| *C22C 38/38* | (2006.01) |
| *C22C 38/22* | (2006.01) |
| *C22C 38/26* | (2006.01) |
| *C22C 38/28* | (2006.01) |
| *C22C 38/24* | (2006.01) |
| *C22C 38/02* | (2006.01) |
| *C21D 6/00* | (2006.01) |
| *C22C 38/12* | (2006.01) |
| *C22C 38/14* | (2006.01) |
| *C23C 2/12* | (2006.01) |
| *C23C 2/06* | (2006.01) |
| *C21D 1/22* | (2006.01) |
| *C23C 2/28* | (2006.01) |
| *B23K 101/18* | (2006.01) |
| *B23K 103/04* | (2006.01) |
| *B23K 101/34* | (2006.01) |
| *C21D 9/46* | (2006.01) |
| *B21D 22/02* | (2006.01) |
| *C21D 1/673* | (2006.01) |
| *B21D 35/00* | (2006.01) |

(52) U.S. Cl.
CPC ............ *C22C 38/28* (2013.01); *C22C 38/32* (2013.01); *C22C 38/38* (2013.01); *C23C 2/06* (2013.01); *C23C 2/12* (2013.01); *C23C 2/28* (2013.01); *B21D 22/022* (2013.01); *B21D 35/006* (2013.01); *B23K 2101/185* (2018.08); *B23K 2101/34* (2018.08); *B23K 2103/04* (2018.08); *C21D 1/673* (2013.01); *C21D 9/46* (2013.01)

(56) References Cited

U.S. PATENT DOCUMENTS

| | | | |
|---|---|---|---|
| 6,815,635 | B2 | 11/2004 | Briand et al. |
| 6,825,442 | B2 | 11/2004 | Schroth et al. |
| 6,866,942 | B1 | 3/2005 | Hashimoto et al. |
| 7,011,361 | B2 | 3/2006 | Reed et al. |
| 7,922,067 | B2 | 4/2011 | Stevenson |
| 8,141,230 | B2 | 3/2012 | Brodt et al. |
| 9,611,518 | B2 | 4/2017 | Naitou et al. |
| 9,623,515 | B2 | 4/2017 | Breuer et al. |
| 9,708,685 | B2 | 7/2017 | Teague |
| 9,725,782 | B2 | 8/2017 | Nonaka et al. |
| 9,765,677 | B2 | 9/2017 | Uchikawa |
| 9,827,633 | B2 | 11/2017 | Schmit et al. |
| 9,862,058 | B2 | 1/2018 | Breuer et al. |
| 9,873,929 | B2 | 1/2018 | Kim |
| 9,920,408 | B2 | 3/2018 | Nam et al. |
| 10,196,727 | B2 | 2/2019 | Takagi et al. |
| 2012/0040205 | A1 | 2/2012 | Lenze et al. |
| 2013/0105446 | A1 | 5/2013 | Briand et al. |
| 2014/0338798 | A1 | 11/2014 | Thomas et al. |
| 2014/0345753 | A1 | 11/2014 | Bors |
| 2017/0016086 | A1 | 1/2017 | Sanadres et al. |
| 2017/0120391 | A1 | 5/2017 | Schmit et al. |
| 2017/0173734 | A1 | 6/2017 | Evangelista et al. |
| 2017/0247774 | A1 | 8/2017 | Sachdev et al. |
| 2017/0268078 | A1 | 9/2017 | Sanadres et al. |
| 2017/0304952 | A1* | 10/2017 | Cretteur ................ B32B 15/012 |
| 2017/0306437 | A1 | 10/2017 | Nakagawa et al. |
| 2019/0126401 | A1* | 5/2019 | Pavlina .................... C21D 1/22 |

FOREIGN PATENT DOCUMENTS

| | | | |
|---|---|---|---|
| EP | 2103697 | A1 | 9/2009 |
| JP | 2004-315882 | A | 11/2004 |
| KR | 20130122493 | A | 11/2014 |
| WO | WO 2012/120020 | A1 | 9/2012 |
| WO | WO 2013/004910 | A1 | 1/2013 |
| WO | WO 2017/006144 | | 1/2017 |
| WO | WO 2017/006159 | A1 | 1/2017 |

OTHER PUBLICATIONS

International Search Report and Written Opinion dated Jan. 6, 2019 for International Application No. PCT/US2018/059006, 16 pages.
International Search Report and Written Opinion dated Mar. 29, 2019 for Application No. PCT/US2018/059002, 10 pgs.
Andrews, K. W. "Empirical formulae for the calculation of some transformation temperatures." J. Iron Steel Inst. (1965): 721-727.
De Cooman, Bruno C., and John G. Speer. "Quench and Partitioning Steel: A New AHSS Concept for Automotive Anti-Intrusion Applications." steel research international 77.9-10 (2006): 634-640.
Ge, R. et al. "Research on Tailored Mechanical Properties of Different Non-Boron Alloyed Steels by Hot Stamping." Advanced High Strength Steel and Press Hardening, ICHSU (2015). World Scientific Publishing, New Jersey, 2016, pp. 88-93.
Kang, M. et al. "Laser tailor-welded blanks for hot-press-forming steel with arc pretreatment." International Journal of Automotive Technology, Apr. 2015, vol. 16, No. 2, pp. 279-283.
Kang, M. et al. "Laser welding for hot-stamped tailor-welded blanks with high-strength steel/high-energy absorption steel." Journal of Laser Applications 26, Issue 3 (2014). Abstract. https://doi.org/10.2351/1.4881279.
Kim, S. J., Han S. Kim, and B. C. De Cooman. "Dilatometric study of the quench and partitioning (Q&P) process." Materials Science and Technology—Association for Iron and Steel Technology—1 (2007): 73.
Speer, John G., et al. "Analysis of microstructure evolution in quenching and partitioning automotive sheet steel." Metallurgical and materials transactions A 42.12 (2011): 3591.
Speer, J. G., et al. "Quenching and partitioning: a fundamentally new process to create high strength trip sheet microstructures." Symposium on the Thermodynamics, Kinetics, Characterization and Modeling of: Austenite Formation and Decomposition. 2003.
Streicher, A. M., et al. "Quenching and partitioning response of a Si-added TRIP sheet steel." Proceedings of the International Conference on Advanced High-Strength Sheet Steels for Automotive Applications, Warrendale, PA: AIST. 2004.
Trzaska, J., and L. A. Dobrzariski. "Modelling of CCT diagrams for engineering and constructional steels." Journal of Materials Processing Technology 192 (2007): 504-510.

* cited by examiner

PRESS HARDENED STEEL WITH TAILORED PROPERTIES

This application claims priority to U.S. Provisional Patent Application No. 62/580,591 entitled "Press Hardened Steel with Tailored Properties," filed on Nov. 2, 2017, the disclosure of which is incorporated by reference herein.

BACKGROUND

Press hardened steels are produced via a hot stamping process in which the steel is deformed at high temperatures at which austenite is stable and then quenched in the stamping die at sufficient cooling rates such that martensite is formed. These steels are typically used in structural members in automotive applications where high strength and high intrusion resistance are required. Press hardened steels with tailored properties are attractive for such applications because they can provide both high intrusion resistance in addition to high energy absorption as the result of relatively hard and soft areas in the component. Tailored properties may be obtained through the use of tailor-welded blanks, which are blanks composed of two steel sheets with different compositions or thicknesses.

Typical commercial press hardened steels (for example, 22MnB5) have ultimate tensile strengths of approximately 1500 MPa with total elongations of approximately 6-8%. Conventional press hardened steel sheets may be joined to a steel with lower hardenability, and which transforms to a softer microstructure (ultimate tensile strengths of approximately 700 MPa) after press hardening. This combination of steel is typically called a tailor-welded blank (TWB). Press hardened TWBs result in components that have tailored properties with regions of high strength and relatively low elongation in areas that require intrusion resistance and regions of lower strength and higher elongation in areas that require energy absorption.

SUMMARY

The present compositions can be used in press hardened steels, hot press forming steels, hot stamping steels, or any other steel that is heated to an austenitizing temperature, formed, and then quenched in a stamping die to achieve the desired final properties of the stamped component. The current application describes tailor-welded blanks composed of a high alloy steel that can exhibit very high strengths after press hardening—up to 2,000 MPa—and a lower alloyed steel that can exhibit more moderate strengths—up to 1,000 MPa—and higher elongation—up to 20%.

DETAILED DESCRIPTION

Figure 1:
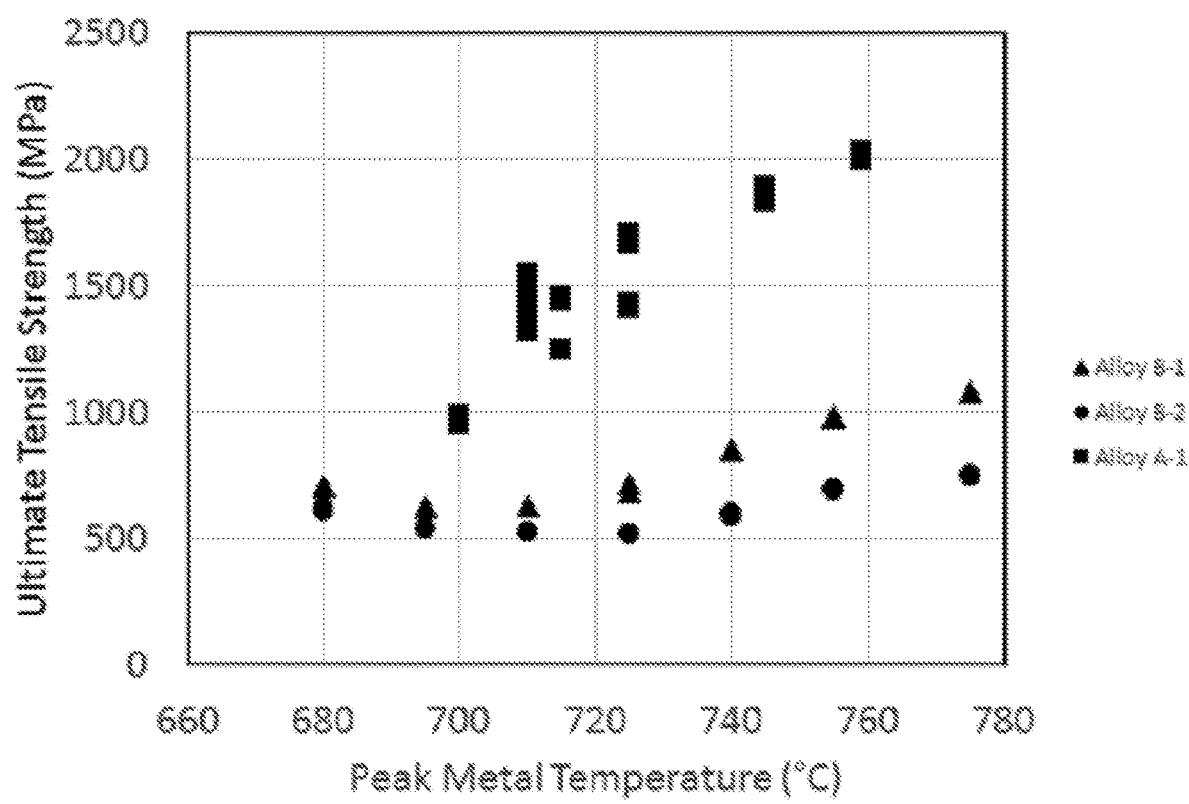
FIG. 1 shows the ultimate tensile strength of steels conforming to Alloy A and Alloy B after press hardening simulations.

A tailor-welded blank comprises a higher alloyed steel (Alloy A) and a lower alloyed steel (Alloy B). After press hardening, Alloy A forms a microstructure that exhibits higher strength compared to Alloy B. In some embodiments, under some press hardening conditions, the total elongation of Alloy A may exceed that of Alloy B after press hardening.

Alloy A and Alloy B can each be made using conventional steel making, roughing, and finishing processes. Embodiments of Alloy A and Alloy B may each be bare or coated. Embodiments of Alloy A and Alloy B can be joined by laser welding, or other known joining techniques, to form a tailor-welded blank. During press hardening, the TWB is heated to temperatures above the lower critical temperature ($Ac_1$) of Alloy A, transferred to a die, formed, and then cooled in the die to achieve the desired final properties. The $Ac_1$ temperature for a given steel composition is the temperature which corresponds to the boundary between the ferrite+cementite phase field and the phase fields of austenite+ferrite or austenite+cementite. The $Ac_1$ temperature for each composition of Alloy A can be determined by calculations known in the art, or empirically, for example by dilatometry. Calculations known in the art include the following three exemplary calculations:

$$Ac_1 = 723 - 10.7X_{Mn} - 16.9X_{Ni} + 29.1X_{Si} + 16.9X_{Cr} + 290X_{As} + 6.38X_W^{1} \quad \text{Eqtn 1:}$$

$$Ac_1 = 739 - 22.8X_C - 60.8X_{Mn} - 15X_{Ni} + 18.2X_{Si} + 11.7X_{Cr} + 6.4X_{Mo} + 5X_V - 28X_{Cu}^{2} \quad \text{Eqtn 2:}$$

$$Ac_1 = 754.83 - 32.25X_C - 17.76X_{Mn} + 23.32X_{Si} + 17.3X_{Cr} + 4.51X_{Mo} + 15.62X_V^{3} \quad \text{Eqtn 3:}$$

[1] K. W. Andrews, Empirical Formulae for the Calculation of Some Transformation Temperatures, JISI, Vol. 203, 1965, pp. 721-727.

[2] TRZASKA, J. et al. *Modelling of CCT Diagrams for Engineering and Constructional Steels*. Journal of Materials Processing Technology, 192-193, 2007, 504-510.

[3] KARIYA, N. High Carbon Hot-Rolled Steel Sheet and Method for Production Thereof. European patent Application EP 2.103.697.A1, 23 Sep. 2009, 15 p.

Additionally, during press hardening, the TWB may also be heated to temperatures above the upper critical temperature ($Ac_3$) of Alloy A, transferred to a die, formed, and then cooled in the die to achieve the desired final properties. The $Ac_3$ temperature for a given steel composition is the temperature which corresponds to the boundary between the ferrite+austenite phase field and the austenite phase field. The $Ac_3$ temperature for each composition of Alloy A can be determined by calculations known in the art, or empirically, for example by dilatometry. Calculations known in the art include the following exemplary calculation:

$$Ac_3 = 910 - 203\sqrt{X_c} - 15.2X_{Ni} + 44.7X_{Si} + 104X_V + 31.5X_{Mo} + 13.1X_W^{4} \quad \text{Eqtn 4:}$$

[4] K. W. Andrews, Empirical Formulae for the Calculation of Some Transformation Temperatures, JISI, Vol. 203, 1965, pp. 721-727.

Alloy A employs a novel alloying strategy that uses substitutional elements to increase the strength of martensite through a combination of substitutional solute strengthening and a reduction in softening that results from autotempering. Softening as a result of autotempering is minimized by suppression of the martensite start temperature through alloying. As a result of the increased hardenability in the proposed compositions that results from various additions of manganese, chromium, molybdenum, and niobium, the novel compositions permit a substantially boron-free press hardening steel.

Alloy B employs an alloying strategy such that the intercritical temperature of this alloy may overlap with that of the higher alloyed Alloy A or overlap temperatures corresponding to full austenitization of Alloy A. As a result, after press hardening, the microstructure of Alloy B is primarily a mixture of ferrite, bainite, and martensite.

Carbon is added to reduce the martensite start temperature, provide solid solution strengthening, and to increase the hardenability of the steel. Carbon is an austenite stabilizer. In certain embodiments of Alloy A, carbon can be present in concentrations of 0.1-0.50 weight %; in other embodiments, carbon can be present in concentrations of 0.1-0.35 weight %; and in still other embodiments, carbon can be present in concentrations of about 0.22-0.25 weight %. In certain embodiments of Alloy B, carbon can be present in concentrations of 0.06-0.12 weight %; in other embodiments, carbon can be present in concentrations of 0.08-0.1 weight %; in other embodiments, carbon can be present in concentrations of 0.09-0.12 weight %; and in still other embodiments, carbon can be present in concentrations of 0.06-0.085 weight %.

Manganese is added to reduce the martensite start temperature, provide solid solution strengthening, and to increase the hardenability of the steel. Manganese is an austenite stabilizer. In certain embodiments of Alloy A, manganese can be present in concentrations of 2.0-8.0 weight %; in other embodiments, manganese can be present in concentrations of 2.0-5.0 weight %; in still other embodiments, manganese can be present in concentrations of 3.0 weight %-8.0 weight %; and in still other embodiments, manganese can be present in concentrations of greater than 3.0 weight %-5.0 weight %. In certain embodiments of Alloy B, manganese can be present in concentrations of 1.65-2.45 weight %; in other embodiments, manganese can be present in concentrations of 2.2-2.45 weight %; in other embodiments, manganese can be present in concentrations of 1.70-1.95 weight %, and in still other embodiments, manganese can be present in concentrations of 1.65-1.85 weight %.

Silicon is added to provide solid solution strengthening. Silicon is a ferrite stabilizer. In certain embodiments of Alloy A, silicon can be present in concentrations of 0.1-0.5 weight %; in other embodiments, silicon can be present in concentrations of 0.2-0.3 weight %. In certain embodiments of Alloy B, silicon can be present in concentrations of 0.1-0.25 weight %; in other embodiments, silicon can be present in concentrations of 0.1-0.2 weight %; and in other embodiments, silicon can be present in concentrations of 0.15-0.25 weight %.

Molybdenum is added to provide solid solution strengthening, to increase the hardenability of the steel, to provide microstructural refinement, and to protect against embrittlement. In certain embodiments of Alloy A, molybdenum can be present in concentrations of 0-2.0 weight %; in other embodiments, molybdenum can be present in concentrations of 0.0-0.6 weight %; in still other embodiments, molybdenum can be present in concentrations of 0.1-2.0 weight %; in other embodiments, molybdenum can be present in concentrations of 0.1-0.6 weight %; and in yet other embodiments, molybdenum can be present in concentrations of 0.4-0.5 weight %. In certain embodiments of Alloy B, molybdenum can be present in concentrations of 0.08-0.4 weight %; in other embodiments, molybdenum can be present in concentrations of 0.08-0.15 weight %; in other embodiments, molybdenum can be present in concentrations of 0.12-0.24 weight %; and in still other embodiments, molybdenum can be present in concentrations of 0.14-0.25 weight %.

Chromium can be added to reduce the martensite start temperature, provide solid solution strengthening, and increase the hardenability of the steel. Chromium is a ferrite stabilizer. In certain embodiments of Alloy A, chromium can be present in concentrations of 0-6.0 weight %; in other embodiments, chromium can be present in concentrations of 2.0-6.0 weight %; in other embodiments, chromium can be present in concentrations of 0.2-6.0 weight %; and in other embodiments chromium can be present in concentrations of 0.2-3.0 weight %. In certain embodiments of Alloy B, chromium can be present in concentrations of 0.0-0.7 weight %; in other embodiments, chromium can be present in concentrations of 0.5-0.7 weight %; in other embodiments, chromium can be present in concentrations of 0.15-0.35 weight %; and in still other embodiments, chromium can be present in concentrations of 0-0.1 weight %.

Niobium can be added to increase strength and improve hardenability of the steel. In some embodiments niobium can also be added to provide improved grain refinement. In certain embodiments of Alloys A and B, niobium can be present in concentrations of 0-0.1 weight %; in other embodiments, niobium can be present in concentrations of 0.01-0.1 weight %; and in other embodiments, niobium can be present in concentrations of 0.001-0.055 weight %. In certain embodiments of Alloy B, niobium can be present in concentrations of 0.0-0.1 weight %; in other embodiments, niobium can be present in concentrations of 0.03-0.05 weight %; in other embodiments, niobium can be present in concentrations of 0.025-0.055 weight %; and in still other embodiments, niobium can be present in concentrations 0.0-0.01 weight %.

Vanadium can be added to increase strength and improve hardenability of the steel. In certain embodiments of Alloy A, vanadium can be present in concentrations of 0-0.15 weight %; and in other embodiments, vanadium can be present in concentrations of 0.01-0.15 weight %. In certain embodiments of Alloy B, vanadium can be present in concentrations of 0.0-0.05 weight %; in other embodiments, vanadium can be present in concentrations of 0-0.01 weight %; and in other embodiments, vanadium can be present in concentrations of 0.02-0.05 weight %.

Boron can be added to increase the hardenability of the steel. In certain embodiments of Alloy A, boron can be present in concentrations of 0-0.005 weight %. In certain embodiments of Alloy B, boron can be present in concentrations of 0.0-0.002 weight %.

Titanium can be added increase the strength of the steel, to control austenite grain size, and to control free nitrogen. In certain embodiments of Alloy B, titanium can be present in concentrations of 0.01-0.05 weight %; in other embodiments titanium can be present in concentrations of 0.018-0.032 weight %; and in other embodiments, titanium can be present in concentrations of 0.01-0.025 weight %.

The press hardened steels can be processed using conventional steel making, roughing, and finishing processes. For example, the steels of Alloy A and of Alloy B may each be continuously cast to produce slabs approximately 12-25 cm in thickness. Slabs may then be reheated at temperatures of 1200-1320° C., and hot rolled to a final gauge of ≥2.5 mm, with the final reduction pass occurring at a temperature of approximately 950° C. Steels may then be coiled at temperatures of 400-675° C. After cooling, the steel coils may be annealed at temperatures of 600-900° C. for times longer than 1 second, and pickled, prior to cold reduction. One or more intermediate annealing and reduction steps may be required before reaching the desired thickness. Such intermediate annealing utilizes temperatures similar to the first annealing treatment.

The alloys of the present application can also be coated with an aluminum-based coating, a zinc-based coating (either galvanized or galvannealed), after cold rolling and before hot stamping. Such coating can be applied to the steel sheet using processes known in the art, including hot dip coating or electrolytic coating. Because of the lower critical temperatures, press hardening of the present alloys after they have been coated is less likely to result in melting of the coating and the detrimental effects associated with such melting.

In embodiments of the present invention, steel blanks of a chosen Alloy A and chosen Alloy B are welded together to form a TWB, they are then heated to a temperature above Ac1 for Alloy A, transferred to a die, stamped, and cooled in accordance with standard hot-stamping procedures. In other embodiments of the present invention, steel blanks of a chosen Alloy A and chosen Alloy B are welded together to form a TWB, they are then heated to a temperature above Ac3 for Alloy A, transferred to a die, stamped, and cooled in accordance with standard hot-stamping procedures. Ultimate tensile strengths of approximately 2,000 MPa may be achieved in Alloy A under appropriate press hardening conditions. Under these same conditions, steels of Alloy B may result in ultimate tensile strengths of approximately 700-980 MPa and total elongations of 13-20%.

Example 1

Three steels, Alloy A-1, Alloy B-1, and Alloy B-2 were prepared with the following nominal compositions in weight percent: Alloy A-1 is 0.22% C, 5% Mn, 0.25% Si, 0.2% Cr, Fe/impurities—balance; Alloy B-1 is 0.09% C, 2.3% Mn, 0.15% Si, 0.02% Ti, Fe/impurities—balance; and Alloy B-2 is 0.08% C, 1.7% Mn, 0.18% Si, 0.013% Ti, 0.035% V, 0.017% Mo, Fe/impurities—balance. The $Ac_1$ temperature of Alloy A-1 is approximately 677° C. and was determined using dilatometry.

Each of the steels were melted, cast, hot rolled, and cold rolled in accordance with standard practice for stainless steels.

Figure 2:
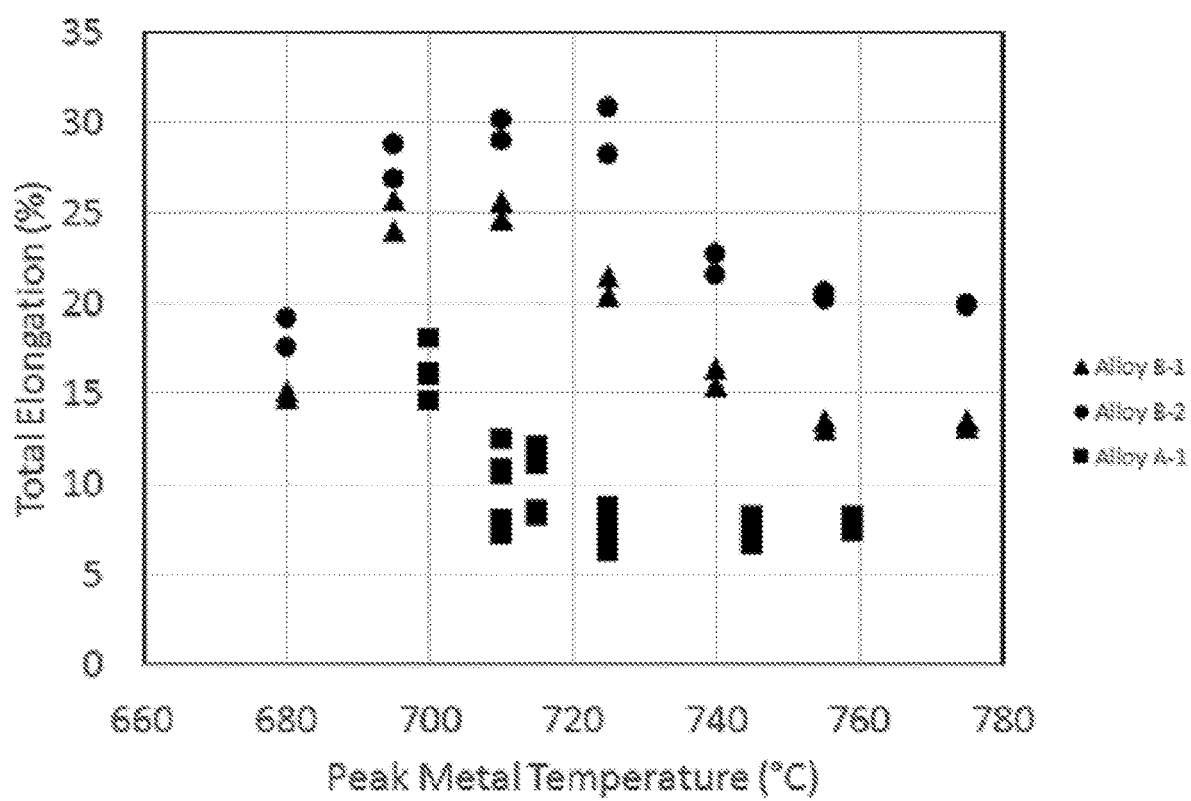
FIG. 2 shows the total elongation of steels conforming to Alloy A and Alloy B after press hardening simulations.

Samples of each of the steels were heated to the peak metal temperatures shown in FIGS. 1 and 2, and held for 300 s before quenching in water-cooled dies. FIG. 1 shows the ultimate tensile strength of steels conforming to Alloy A and B after press hardening simulations. FIG. 2 shows the total elongation of steels conforming to Alloy A and B after press hardening simulations.

FIGS. 1 and 2 show properties after simulated press hardening of steels corresponding to the compositions of Alloy A and B. Table 1 summarizes the properties after simulated press hardening.

TABLE 1

Mechanical Properties of Alloys A and B after Simulated Press Hardening

| Alloy | Peak Metal Temperature (° C.) | Yield Strength (MPa) | Ultimate Tensile Strength (MPa) | Uniform Elongation (%) | Total Elongation (%) |
|---|---|---|---|---|---|
| A-1 | 700 | 892 | 954 | 10.9 | 16.1 |
| A-1 | 700 | 926 | 971 | 10.0 | 14.6 |
| A-1 | 700 | 848 | 983 | 13.7 | 18 |
| A-1 | 700 | 840 | 976 | 13.1 | 16 |
| A-1 | 715 | 536 | 1247 | 11.1 | 12.1 |
| A-1 | 715 | 540 | 1248 | 10.6 | 11.1 |
| A-1 | 715 | 637 | 1438 | 8.4 | 8.5 |
| A-1 | 715 | 651 | 1457 | 8.1 | 8.2 |
| A-1 | 725 | 668 | 1429 | 8.3 | 8.7 |
| A-1 | 725 | 637 | 1412 | 8.1 | 8.1 |
| A-1 | 725 | 970 | 1708 | 6.3 | 6.3 |
| A-1 | 725 | 898 | 1664 | 7.0 | 7.3 |
| A-1 | 710 | 479 | 1319 | 12.3 | 12.5 |
| A-1 | 710 | 549 | 1387 | 10.2 | 10.5 |
| A-1 | 710 | 583 | 1432 | 10.7 | 10.8 |
| A-1 | 710 | 678 | 1515 | 7.3 | 7.3 |
| A-1 | 710 | 649 | 1501 | 8.0 | 8.0 |
| A-1 | 710 | 673 | 1549 | 7.5 | 7.5 |
| A-1 | 745 | 1228 | 1871 | 6.2 | 8.2 |
| A-1 | 745 | 1289 | 1869 | 4.7 | 6.7 |
| A-1 | 745 | 1229 | 1858 | 5.4 | 7.4 |
| A-1 | 745 | 1233 | 1843 | 5.9 | 7.9 |
| A-1 | 745 | 1325 | 1895 | 5.3 | 7.2 |
| A-1 | 745 | 1186 | 1831 | 5.1 | 7.4 |
| A-1 | 759 | 1307 | 1995 | 5.9 | 7.4 |
| A-1 | 759 | 1349 | 2027 | 6.4 | 8.2 |
| B-1 | 680 | 682 | 713 | 10.9 | 14.8 |
| B-1 | 680 | 688 | 707 | 10.8 | 15.1 |
| B-1 | 695 | 584 | 628 | 16.4 | 24.0 |
| B-1 | 695 | 574 | 622 | 16.6 | 25.7 |
| B-1 | 710 | 541 | 630 | 17.3 | 24.6 |
| B-1 | 710 | 551 | 629 | 17.9 | 25.6 |
| B-1 | 725 | 366 | 682 | 15.7 | 20.4 |
| B-1 | 725 | 390 | 716 | 15.9 | 21.5 |
| B-1 | 740 | 405 | 852 | 12.7 | 16.4 |
| B-1 | 740 | 406 | 858 | 12.1 | 15.4 |
| B-1 | 755 | 491 | 983 | 9.6 | 13.0 |
| B-1 | 755 | 491 | 984 | 10.1 | 13.5 |
| B-1 | 775 | 623 | 1084 | 9.0 | 13.5 |
| B-1 | 775 | 618 | 1075 | 8.9 | 13.1 |
| B-2 | 680 | 559 | 609 | 12.4 | 19.2 |
| B-2 | 680 | 581 | 624 | 12.5 | 17.5 |
| B-2 | 695 | 482 | 542 | 18.3 | 26.9 |
| B-2 | 695 | 493 | 539 | 18.4 | 28.8 |
| B-2 | 710 | 464 | 524 | 19.1 | 30.1 |
| B-2 | 710 | 459 | 524 | 19.9 | 29.0 |
| B-2 | 725 | 424 | 519 | 20.7 | 28.2 |
| B-2 | 725 | 424 | 519 | 21.5 | 30.8 |
| B-2 | 740 | 276 | 600 | 16.0 | 21.6 |
| B-2 | 740 | 267 | 590 | 16.8 | 22.7 |
| B-2 | 755 | 321 | 695 | 15.2 | 20.2 |
| B-2 | 755 | 320 | 693 | 14.8 | 20.6 |
| B-2 | 775 | 350 | 743 | 14.3 | 19.9 |
| B-2 | 775 | 353 | 754 | 13.7 | 19.8 |

Example 2

A tailor-welded blank is made of a steel of Alloy A welded to a steel of Alloy B, wherein Alloy A and Alloy B contain the compositions set forth in Table 2 below (wherein the balance of the composition for each alloy is Fe and impurities associated with steelmaking):

TABLE 2

Chemical Composition (in weight percent) of Alloys A and B

| Alloy | C | Si | Mn | Cr | Mo | Nb | V | Ti | B |
|---|---|---|---|---|---|---|---|---|---|
| A | 0.10-0.50 | 0.1-0.5 | 2.0-8.0 | 0.00-6.0 | 0-2.0 | 0-0.1 | 0-0.15 | — | 0-0.005 |
| B | 0.06-0.12 | 0.1-0.25 | 1.65-2.45 | 0-0.70 | 0.08-0.40 | 0-0.1 | 0-0.05 | 0.01-0.05 | 0-0.002 |

Process A: After welding, the blank is heated to a temperature above the Ac1 temperature for Alloy A, transferred to a die, formed, and then cooled in the die.

Process B: After welding, the blank is heated to a temperature above the Ac3 temperature for Alloy A, transferred to a die, formed, and then cooled in the die.

Example 3

A tailor-welded blank in accordance with the tailor-welded blank of Example 2, or any or more of the following example, wherein the carbon concentration in Alloy A is 0.1-0.35 weight %, and alternatively 0.22-0.25 weigh %.

Example 4

A tailor-welded blank in accordance with the tailor-welded blank of any one or more of Examples 2-3, or any or more of the following examples, wherein the carbon concentration in Alloy B is 0.08-0.1 weight %; alternatively 0.09-0.12 weight %, or alternatively 0.06-0.085 weight %.

Example 5

A tailor-welded blank in accordance with the tailor-welded blank of any one or more of Examples 2-4, or any or more of the following examples, wherein the manganese concentration in Alloy A is 2.0-5.0 weight %; alternatively, 3.0 weight %-8.0 weight %; or alternatively 3.0 weight %-5.0 weight %.

Example 6

A tailor-welded blank in accordance with the tailor-welded blank of any one or more of Examples 2-5, or any or more of the following examples, wherein the manganese concentration in Alloy B is 2.2-2.45 weight %, alternatively 1.70-1.95 weight %, or alternatively 1.65-1.85 weight %.

Example 7

A tailor-welded-blank in accordance with the tailor-welded blank of any one or more of Examples 2-6, or any one or more of the following examples, wherein the silicon concentration in Alloy A is 0.2-0.3 weight %.

Example 8

A tailor-welded blank in accordance with the tailor-welded blank of any one or more of Examples 2-7, or any one or more of the following examples, wherein the silicon concentration in Alloy B is 0.1-0.2 weight %, or alternatively 0.15-0.25 weight %.

Example 9

A tailor-welded blank in accordance with the tailor-welded blank of any one or more of Examples 2-8, or any one or more of the following examples, wherein the molybdenum concentration in Alloy A is 0.0-0.6 weight %; alternatively, 0.1-2.0 weight %; alternatively, 0.1-0.6 weight %; or alternatively 0.4-0.5 weight %.

Example 10

A tailor-welded blank in accordance with the tailor-welded blank of any one or more of Examples 2-9, or any one or more of the following examples, wherein the molybdenum concentration in Alloy B is 0.08-0.15 weight %, alternatively 0.12-0.24 weight %, or alternatively 0.14-0.25 weight %.

Example 11

A tailor-welded blank in accordance with the tailor-welded blank of any one or more of Examples 2-10, or any one or more of the following examples, wherein the chromium concentration is 2.0-6.0 weight %; alternatively, 0.2-6.0 weight %; or alternatively 0.2-3.0 weight %.

Example 12

A tailor-welded blank in accordance with the tailor-welded blank of any one or more of Examples 2-11, or any one or more of the following examples, wherein the chromium concentration in Alloy B is 0.5-0.7 weight %, alternatively 0.15-0.35 weight %, or alternatively 0-0.1 weight %.

Example 13

A tailor-welded blank in accordance with the tailor-welded blank of any one or more of Examples 2-12, or any one or more of the following examples, wherein the niobium concentration is 0.01-0.1 weight %; or alternatively 0.001-0.055 weight %.

Example 14

A tailor-welded blank in accordance with the tailor-welded blank of any one or more of Examples 2-13, or any one or more of the following examples, wherein the niobium concentration in Alloy B is 0.03-0.05 weight %, alternatively 0.025-0.055 weight %, or alternatively 0.0-0.01 weight %.

Example 15

A tailor-welded blank in accordance with the tailor-welded blank of any one or more of Examples 2-14, or any one or more of the following examples, wherein the vanadium concentration is 0.01-0.15 weight %.

Example 16

A tailor-welded blank in accordance with the tailor-welded blank of any one or more of Examples 2-15, or any one or more of the following examples, wherein the vanadium concentration in Alloy B is 0.0-0.01 weight %, or alternatively 0.02-0.05 weight %.

Example 17

A tailor-welded blank in accordance with the tailor-welded blank of any one or more of Examples 2-16, or any one or more of the following examples, wherein the titanium concentration in Alloy B is 0.018-0.032 weight %, or alternatively 0.01-0.025 weight %.

Example 19

A tailor-welded blank in accordance with the tailor-welded blank of any one or more of Examples 2-17, or the following example, wherein Alloy A is coated with aluminum or zinc, or alloys thereof.

Example 20

A tailor-welded blank in accordance with the tailor-welded blank of any or more of one of the Examples 2-19, wherein Alloy B is coated with aluminum or zinc, or alloys thereof.

What is claimed is:

1. A tailor-welded blank comprising Alloy A and Alloy B, wherein Alloy A comprises 0.10-0.50 wt % C, 0.1-0.5 wt % Si, 2.0-8.0 wt % Mn, 0.0-6.0 wt % Cr, 0.0-2 wt % Mo, 0.0-0.1 wt % Nb, 0.0-0.15 wt % V, and 0.0-0.005 wt % B, the balance Fe and impurities associated with steelmaking and wherein Alloy B comprises 0.06-0.12 wt % C, 0.1-0.25 wt % Si, 1.65-2.45 wt % Mn, 0.0-0.70 wt % Cr, 0.08-0.40 wt % Mo, 0.025-0.055 wt % Nb, 0.0-0.05 wt % V, 0.01-0.05 wt % Ti, and 0.0-0.002 wt % B, the balance Fe and impurities associated with steelmaking, wherein after press-hardening of the tailor-welded blank Alloy A exhibits an ultimate tensile strength greater than or equal to about 950 MPa and a total elongation of less than or equal to about 18% and Alloy B exhibits an ultimate tensile strength of about 450-800 MPa and a total elongation of greater than or equal to about 12%, and the ultimate tensile strength of Alloy A after press hardening of the tailor-welded blank is higher than the ultimate tensile strength of Alloy B and the total elongation of Alloy A is lower than that of Alloy B.

2. The tailor-welded blank in accordance with claim 1, wherein the carbon concentration in Alloy A is 0.1-0.35 weight %.

3. The tailor-welded blank in accordance with claim 2 wherein the carbon concentration in Alloy A is 0.22-0.25 weight %.

4. The tailor-welded blank of claim 1, wherein the manganese concentration in Alloy A is 2.0-5.0 weight %.

5. The tailor-welded blank of claim 1, wherein the manganese concentration in Alloy A is 3.0 weight %-8.0 weight %.

6. The tailor-welded blank of claim 5; wherein the manganese concentration in Alloy A is 3.0 weight %-5.0 weight %.

7. The tailor-welded-blank of claim 1, wherein the silicon concentration in Alloy A is 0.2-0.3 weight %.

8. The tailor-welded blank of claim 1, wherein the molybdenum concentration in Alloy A is 0.0-0.6 weight %.

9. The tailor-welded blank of claim 1, wherein the molybdenum concentration in Alloy A is 0.1-2.0 weight %.

10. The tailor-welded blank of claim 9, wherein the molybdenum concentration in Alloy A is 0.1-0.6 weight %.

11. The tailor-welded blank of claim 10, wherein the molybdenum concentration in Alloy A is 0.4-0.5 weight %.

12. The tailor-welded blank of claim 1, wherein the chromium concentration in Alloy A is 2.0-6.0 weight %.

13. The tailor-welded blank of claim 1, wherein the chromium concentration in Alloy A is 0.2-6.0 weight %.

14. The tailor-welded blank of claim 13, wherein the chromium concentration in Alloy A is 0.2-3.0 weight %.

15. The tailor-welded blank of claim 1, wherein the niobium concentration in Alloy A is 0.01-0.1 weight %.

16. The tailor-welded blank of claim 1, wherein the vanadium concentration in Alloy A is 0.01-0.15 weight %.

17. The tailor-welded blank of claim 1, wherein Alloy A is coated with aluminum, zinc, or alloys thereof.

18. The tailor-welded blank of claim 1, wherein Alloy B is coated with aluminum, zinc, or alloys thereof.

19. A method of manufacturing a tailor-welded blank according to claim 1 comprising the steps of:
   a. obtaining a steel of Alloy A,
   b. obtaining a steel of Alloy B,
   c. welding the steel of Alloy A to the steel of Alloy B;
   d. heating the welded blank to a temperature above the Ac1 temperature for Alloy A,
   e. forming in a die,
   f. cooling said blank in the die.

20. A method of manufacturing a tailor-welded blank according to claim 1 comprising the steps of:
   a. obtaining a steel of Alloy A;
   b. obtaining a steel of Alloy B;
   c. welding the steel of Alloy A to the steel of Alloy B;
   d. heating the welded blank to a temperature above the Ac3 temperature for Alloy A,
   e. forming in a die,
   f. cooling said blank in the die.

21. A tailor-welded blank comprising Alloy A and Alloy B, wherein Alloy A comprises 0.10-0.50 wt % C, 0.1-0.5 wt % Si, 2.0-8.0 wt % Mn, 0.0-6.0 wt % Cr, 0.0-2 wt % Mo, 0.001-0.055 weight % Nb, 0.0-0.15 wt % V, and 0.0-0.005 wt % B, the balance Fe and impurities associated with steelmaking and wherein Alloy B comprises 0.06-0.12 wt % C, 0.1-0.25 wt % Si, 1.65-2.45 wt % Mn, 0.0-0.70 wt % Cr, 0.08-0.40 wt % Mo, 0.025-0.055 wt % Nb, 0.0-0.05 wt % V, 0.01-0.05 wt % Ti, and 0.0-0.002 wt % B, the balance Fe and impurities associated with steelmaking, wherein after press-hardening of the tailor-welded blank Alloy A exhibits an ultimate tensile strength greater than or equal to about 950 MPa and a total elongation of less than or equal to about 18% and Alloy B exhibits an ultimate tensile strength of about 450-800 MPa and a total elongation of greater than or equal to about 12%, and the ultimate tensile strength of Alloy A after press hardening of the tailor-welded blank is higher than the ultimate tensile strength of Alloy B and the total elongation of Alloy A is lower than that of Alloy B.

* * * * *